(12) United States Patent
Aoki et al.

(10) Patent No.: US 10,851,217 B2
(45) Date of Patent: Dec. 1, 2020

(54) EPOXY RESIN COMPOSITION, PREPREG, AND CARBON FIBER REINFORCED COMPOSITE MATERIAL

(71) Applicant: TORAY INDUSTRIES, INC., Tokyo (JP)

(72) Inventors: Junichi Aoki, Ehime (JP); Koji Furukawa, Ehime (JP); Kyoko Tamaru, Ehime (JP); Atsuhito Arai, Ehime (JP); Hiroaki Sakata, Ehime (JP); Takashi Ochi, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 296 days.

(21) Appl. No.: 15/756,815

(22) PCT Filed: Aug. 31, 2016

(86) PCT No.: PCT/JP2016/075520
§ 371 (c)(1),
(2) Date: Mar. 1, 2018

(87) PCT Pub. No.: WO2017/038880
PCT Pub. Date: Mar. 9, 2017

(65) Prior Publication Data
US 2018/0244880 A1 Aug. 30, 2018

(30) Foreign Application Priority Data

Sep. 3, 2015 (JP) ................................. 2015-173517

(51) Int. Cl.

| | |
|---|---|
| *C08J 5/24* | (2006.01) |
| *B32B 27/18* | (2006.01) |
| *B32B 27/26* | (2006.01) |
| *B32B 27/38* | (2006.01) |
| *C08G 59/32* | (2006.01) |
| *C08G 59/38* | (2006.01) |
| *C08G 59/50* | (2006.01) |
| *C08G 59/56* | (2006.01) |
| *C08L 63/00* | (2006.01) |
| *C08J 5/04* | (2006.01) |

(52) U.S. Cl.
CPC ............... *C08J 5/24* (2013.01); *C08G 59/32* (2013.01); *C08G 59/38* (2013.01); *C08J 5/042* (2013.01); *C08L 63/00* (2013.01)

(58) Field of Classification Search
CPC . C08J 5/24; C08G 59/32; C08G 59/38; C08G 59/50; C08G 59/5033; C08G 59/56; B32B 27/04; B32B 27/18; B32B 27/26; B32B 27/38; C08L 63/00

USPC ............... 523/427, 428, 440; 428/413, 297.4
See application file for complete search history.

(56) References Cited

U.S. PATENT DOCUMENTS

| | | | |
|---|---|---|---|
| 4,551,508 A * | 11/1985 | Urasaki | C07D 303/24 525/481 |
| 2009/0130379 A1 | 5/2009 | Kousaka et al. | |
| 2011/0049426 A1 | 3/2011 | Patel et al. | |
| 2012/0178329 A1* | 7/2012 | Kochi | C08K 5/435 442/205 |
| 2014/0128505 A1* | 5/2014 | Hamada | C08G 59/063 523/400 |
| 2015/0210847 A1* | 7/2015 | Mortimer | C08L 63/00 523/427 |
| 2016/0130431 A1* | 5/2016 | Nagano | C08L 63/00 523/427 |
| 2017/0158829 A1* | 6/2017 | Hondo | C08G 59/621 |

FOREIGN PATENT DOCUMENTS

| | | | | |
|---|---|---|---|---|
| JP | 61218623 A | * | 9/1986 | ............ C08G 59/32 |
| JP | 01104624 A | | 4/1989 | |
| JP | 2002363253 A | | 12/2002 | |
| JP | 2004075914 A | | 3/2004 | |
| JP | 2007297549 A | | 11/2007 | |
| JP | 2009263550 A | | 11/2009 | |

(Continued)

OTHER PUBLICATIONS

Machine translation of JP-61218623-A (no date).*

(Continued)

*Primary Examiner* — Michael J Feely
(74) *Attorney, Agent, or Firm* — RatnerPrestia

(57) ABSTRACT

Provided are: an epoxy resin composition that gives a carbon fiber-reinforced composite material having excellent moldability, heat resistance, and mechanical properties such as tensile strength and compressive strength; and a prepreg. An epoxy resin composition containing at least the following constituent elements [A]-[D]. The epoxy resin composition contains 5-50 parts by mass of constituent element [A] and 20-95 parts by mass of constituent element [B], as well as 1-25 parts by mass of constituent element [C], relative to 100 parts by mass of the total amount of epoxy resin. Constituent element [A] is an epoxy resin having primarily two epoxy groups and one or more condensed polycyclic aromatic hydrocarbon skeletons within a repeating unit of a specific structure; [B] is a glycidylamine epoxy resin having three or more glycidyl groups in the molecule; [C] is a sulfone or imide thermoplastic resin; and [D] is an epoxy resin curing agent.

18 Claims, No Drawings

(56) References Cited

FOREIGN PATENT DOCUMENTS

| JP | 2010100834 A | 5/2010 | |
|---|---|---|---|
| JP | 2011016985 A | 1/2011 | |
| JP | 2011213784 A | 10/2011 | |
| JP | 2012136568 A | 7/2012 | |
| JP | 2014145017 A | 8/2014 | |
| WO | 2007125929 A1 | 11/2007 | |
| WO | WO-2014107725 A1 * | 7/2014 | ............... C08K 7/02 |
| WO | WO-2015012348 A1 * | 1/2015 | ............. C08L 63/00 |
| WO | WO-2016017371 A1 * | 2/2016 | ............. C08G 59/62 |

OTHER PUBLICATIONS

International Search Report and Written Opinion for International Application No. PCT/JP2016/075520, dated Nov. 22, 2016—7 Pages.

* cited by examiner

EPOXY RESIN COMPOSITION, PREPREG, AND CARBON FIBER REINFORCED COMPOSITE MATERIAL

CROSS REFERENCE TO RELATED APPLICATIONS

This is the U.S. National Phase application of PCT/JP2016/075520, filed Aug. 31, 2016, which claims priority to Japanese Patent Application No. 2015-173517, filed Sep. 3, 2015, the disclosures of these applications being incorporated herein by reference in their entireties for all purposes.

FIELD OF THE INVENTION

The present invention relates to an epoxy resin composition used suitably for a carbon fiber reinforced composite material. More specifically, it relates to an epoxy resin composition that serves to form a carbon fiber reinforced composite material having high moldability and high heat resistance and also having good mechanical properties including tensile strength and compressive strength.

BACKGROUND OF THE INVENTION

High in specific strength and specific modulus, carbon fiber reinforced composite materials (hereinafter occasionally referred to simply as composite materials) in recent years have come into wider use in various fields including aircraft, automobiles, sports tools, fishing tools, blades for wind power generation, and personal computer housing. These structures often have complicated shapes and many of them are produced by laminating layers of carbon fiber reinforced woven fabric prepreg that is in the form of thin, flexible sheets with isotropic material properties.

These prepreg sheets are generally produced from resin compositions of thermosetting resins, epoxy resin among others, that have good mechanical properties, high heat resistance, and high process-related handleability. In the field of application to structures such as aircraft and automobiles, there are increasing demands in recent years for materials with improved mechanical properties required for production of lightweight products. Required improvements also include further betterment of such important properties as tensile strength and compressive strength and persistent physical properties in high humidity, high temperature environments. For providing composite materials with increased tensile strength, not only improvement in the tensile strength of the carbon fibers used as base material, but also reduction in the crosslink density in cured products of epoxy resin compositions (hereinafter occasionally referred to simply as cured products) is effective. However, a reduction in crosslink density leads to the problem of decrease in heat resistance. On the other hand, a cured material with a high elastic modulus can work effectively in producing a composite material with improved compressive strength (Patent document 1). However, a high crosslink density is an effective factor in producing a cured material with improved elastic modulus. Thus, it has been a very difficult issue to produce a composite material that is high in both tensile strength and compressive strength.

To achieve both a high tensile strength and a high compressive strength, it is thought to be effective to introduce special sites into molecular chains to enable interaction among them while maintaining a low crosslink density in the cured material, in order to depress the movements of the molecular chains. Promising techniques for depressing the movements of molecular chains in cured material include increasing the number of epoxy functional groups to increase the crosslink density and introducing a flexible structure or a molecular structure that is expected to cause interaction among molecular chains. In addition, in order to maintain good mechanical properties in a high humidity, high temperature environment, it is thought to be effective to maintain a hydrophobic environment within molecular chains to decrease the water absorbing capacity.

In particular, the introduction of an aromatic rigid backbone is effective as a method to improve the mechanical properties while maintaining a high heat resistance in the composite material. The method proposed in Patent document 2 uses a resin composition that combines epoxy resins having two naphthalene backbones with the aim of improving the heat resistance, fire retardancy, etc. However, no findings are described about the mechanical properties, such as tensile strength and compressive strength, of composite materials. In Patent document 3, furthermore, improvement of mechanical properties is attempted by using tri- or more functional bis-naphthalene type epoxy resins, but the crosslink density increases to make it impossible to achieve an adequate tensile strength.

Honeycomb sandwich structures have been used widely to produce lightweight products. When carbon fiber reinforced woven fabric prepreg is applied to honeycomb sandwich structures, an adhesive film is used to adhere the honeycomb core and the prepreg. Molding defects may result if large resin flows occur during adhesion. Patent document 4 discloses a composite material produced from an epoxy resin composition having a condensed polycyclic aromatic backbone. However, the use of a condensed polycyclic aromatic compound has the problems of leading to molding defects due to large resin flows in the molding temperature region of the adhesion film.

PATENT DOCUMENTS

Patent document 1: Japanese Unexamined Patent Publication (Kokai) No. 2002-363253
Patent document 2: Japanese Unexamined Patent Publication (Kokai) No. 2009-263550
Patent document 3: Japanese Unexamined Patent Publication (Kokai) No. 2014-145017
Patent document 4: Japanese Unexamined Patent Publication (Kokai) No. 2010-100834

SUMMARY OF THE INVENTION

Thus, an object of the present invention is to provide an epoxy resin composition serving to produce a carbon fiber reinforced composite material that is high in moldability, heat resistance, tensile strength, and compressive strength.

As a result of intensive studies on the above problems, the present inventors have arrived at the present invention based on the findings that the problems can be solved by mixing specific epoxy resin components in specific content ranges.

Specifically, the epoxy resin composition according to one aspect of the present invention includes at least the undermentioned components [A] to [D], the component [A] accounting for 5 to 40 parts by mass, the component [B] accounting for 20 to 95 parts by mass, and the component [C] accounting for 1 to 25 parts by mass, relative to the total quantity of the epoxy resins which accounts for 100 parts by mass: [A]: epoxy resin having one or more condensed polycyclic aromatic hydrocarbon backbones and mainly two epoxy groups in each repeating unit as represented by general formula [1] or [4].

[Chemical formula 1]

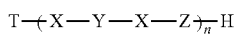

[Chemical formula 2]

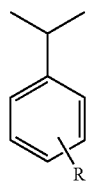

[Chemical formula 3]

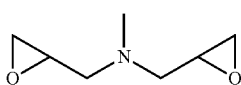

[Chemical formula 4]

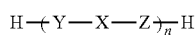

(In general formulae [1] and [4], X is an alkylene group containing 1 or 2 carbon atoms or a group as represented by general formula [2]. In general formula [2], R is one selected from the group consisting of a glycidyl ether group, a group as represented by general formula [3], hydrogen atom, halogen atom, a phenyl group, and an alkyl group containing 1 to 4 carbon atoms. Y is an aromatic ring or a condensed polycyclic aromatic hydrocarbon. Z is a condensed polycyclic aromatic hydrocarbon. Y and Z each have a glycidyl ether group, or either Y or Z has a substituent group as represented by general formula [3], and each repeating unit mainly contains two epoxy groups. Here, the aromatic ring and condensed polycyclic aromatic ring in Y or Z may be bonded to the backbone chain at the ortho position or the meta position. T is either a condensed polycyclic aromatic hydrocarbon or a hydrogen atom.)

[B]: a glycidyl amine type epoxy resin having three or more glycidyl groups in a molecule

[C]: sulfone based or imide based thermoplastic resin

[D]: epoxy resin curing agent.

The prepreg according to one aspect of the present invention is one produced by impregnating reinforcement fiber with the epoxy resin composition and the reinforcement fiber may be a base material in the form of woven fabric. The fiber reinforced composite material according to an aspect of the present invention is a fiber reinforced composite material obtained by curing the aforementioned prepreg.

The present invention can provide an epoxy resin composition that serves to form a carbon fiber reinforced composite material having high moldability and high heat resistance and also having good mechanical properties including tensile strength and compressive strength.

DETAILED DESCRIPTION OF EMBODIMENTS OF THE INVENTION

Described in detail below are the epoxy resin composition, prepreg, and carbon fiber reinforced composite material according to embodiments of the present invention.

In an embodiment of the present invention, epoxy resin [A] (the component [A] is occasionally referred to as epoxy resin [A]) is an epoxy resin having one or more condensed polycyclic aromatic hydrocarbon backbones and mainly two epoxy groups in each repeating unit as represented by general formula [1] or [4]. The term "mainly" means that the epoxy resin chains having two epoxy groups in each repeating unit account for 40 mass % or more. Epoxy resin [A] contains an aromatic ring or a condensed polycyclic aromatic hydrocarbon such as naphthalene and anthracene in one molecule. The introduction of a molecular structure having an aromatic backbone serves to increase the rigidity, leading to high resin elastic modulus and high heat resistance. X in general formulas [1] and [4] works to bond an aromatic compound and an end group. T is either a condensed polycyclic aromatic hydrocarbon or a hydrogen atom. X in the formulae is an alkylene group containing 1 or 2 carbon atoms or a substituent group as represented by general formula [2]. An alkylene group containing less carbon atoms is smaller in free volume and serves to achieve a higher elastic modulus. In general formulae [1] or [4], at least one condensed polycyclic aromatic hydrocarbon is necessary in a repeating unit to ensure high heat resistance and molecular rigidity. In the formulae, Y is either an aromatic ring or a condensed polycyclic aromatic hydrocarbon and Z is a condensed polycyclic aromatic hydrocarbon. In the formulae, Y and Z may represents the same backbone. In the formulae, Y and Z each have a glycidyl ether group, or either Y or Z has a substituent group as represented by general formula [3], and each repeating unit preferably contains two epoxy groups. From the viewpoint of the balance in terms of mechanical strength of the composite material to be obtained, it is preferable that its primary component has two glycidyl ether groups in each unit and accounts for 40 mass % or more. When producing substances as represented by general formula [1] or [4], the resulting compounds may three or four glycidyl ether groups in a repeating unit. From the aforementioned viewpoint of the balance in terms of mechanical strength, it is preferable that those compounds as represented by general formula [1] or [4] and having two epoxy functional groups account for 40 to 80 mass % in epoxy resin [A]. Here, the aromatic ring and condensed polycyclic aromatic ring in Y or Z may be bonded to the backbone chain at the ortho position or the meta position. In view of the flexibility of the molecular structure, bonding at the ortho position, which permits a larger molecular flexibility, is preferable because the free volume, i.e. the space among molecular chains, can be filled to provide a cured material with improved elastic modulus. In addition, n in general formulae [1] and [4] represents the number of repetitions and it is 1 or more. A smaller value of n in the formulae leads to an increased crosslink density, leading to a cured epoxy resin with an improved elastic modulus, and accordingly, n is preferably 1. The end group T is hydrogen when n=1.

A prepreg having good handleability in terms of tackiness and drape property can be produced when epoxy resin [A] accounts for 5 to 40 parts by mass relative to the total epoxy resin quantity, which represents 100 parts by mass.

Commercially available products of epoxy resin [A] include Epicron (registered trademark) HP-4770 (manufactured by DIC Corporation), NC-7300L (naphthol type epoxy, manufactured by Nippon Kayaku Co., Ltd., epoxy equivalent: 220).

Epoxy resin [B] (component [B] is occasionally referred to as epoxy resin [B]) used in an embodiment of the present invention is a glycidyl amine type epoxy resin having three or more glycidyl groups in a molecule. It is preferable for a molecule to contain three or four glycidyl group because the resulting composite material will have mechanical properties and heat resistance in a good balance. Preferable examples of the component [B] include compounds produced by glycidylating a precursor such as diaminodiphenyl methane, diaminodiphenyl sulfone, diaminodiphenyl ether, xylene diamine, aminophenol, a constitutional isomer thereof, a derivative having a halogen atom or an alkyl substituent group having 3 or less carbon atoms. More specifically, they include tetraglycidyl diaminodiphenyl methane, glycidyl compounds of xylene diamine, triglycidyl aminophenol, tetraglycidyl diaminodiphenyl sulfone, and tetraglycidyl diaminodiphenyl ether.

Commercially available products of epoxy resin [B] include the following. Commercially available products of tetraglycidyl diaminodiphenyl methane include Sumiepoxy (registered trademark) ELM434 (manufactured by Sumitomo Chemical Co., Ltd.), Araldite (registered trademark) MY720, Araldite (registered trademark) MY721, Araldite (registered trademark) MY9512, Araldite (registered trademark) MY9612, Araldite (registered trademark) MY9634, and Araldite (registered trademark) MY9663 (all manufactured by Huntsman Advanced Materials Gmbh). Commercially available products of glycidyl compounds of xylene diamine include TETRAD-X (manufactured by Mitsubishi Gas Chemical Company, Inc.). Commercially available products of triglycidyl aminophenol include Araldite (registered trademark) MY0500, Araldite (registered trademark) MY0510 (both manufactured by Huntsman Advanced Materials Gmbh), and jER (registered trademark) 630 (manufactured by Mitsubishi Chemical Corporation), which are produced from p-aminophenol as precursor, and Araldite (registered trademark) MY0600 and Araldite (registered trademark) MY0610 (both manufactured by Huntsman Advanced Materials Gmbh), which are produced from m-aminophenol as precursor. Commercially available products of tetraglycidyl diaminodiphenyl sulfone include TGDDS (manufactured by Konishi Chemical Ind. Co., Ltd.).

Epoxy resin [B] may be a mixture of two or more different epoxy resins selected from the above ones.

To ensure a high-level balance among various mechanical properties, epoxy resin [B] accounts for 20 to 95 parts by mass, preferably 40 to 90 parts by mass, relative to the total quantity of the epoxy resins.

From the viewpoint of ensuring a high heat resistance, thermoplastic resin [C] (component [C] is occasionally referred to as thermoplastic resin [C]) used in an embodiment of the present invention, which is a thermoplastic resin soluble in epoxy resin, preferably has a glass transition temperature (occasionally abbreviated as Tg) of 180° C. or more and preferably has an aromatic ring in its molecule. More specifically, preferable examples include polyethersulfone, polyether ether sulfone, polyether imide, polyphenylene oxide, and polysulfone.

Commercially available products of sulfone based or imide based thermoplastic resin [C] include Sumikaexcel (registered trademark) PES5003P (manufactured by Sumitomo Chemical Co., Ltd.), Virantage (registered trademark) VW10700 (manufactured by Solvay Advanced Polymers), which are polyether sulfone with hydroxyl groups at the chain ends, Sumikaexcel (registered trademark) PES7600P (manufactured by Sumitomo Chemical Co., Ltd.), which is polyether sulfone with chlorinated chain ends, Ultem (registered trademark) 1010 (manufactured by Sabic Innovative Plastics), which is polyether imide with anhydrides or amino groups at the chain ends, and Virantage (registered trademark) VW30500 (manufactured by Solvay Advanced Polymers), which is polysulfone.

The expression of "soluble in epoxy resin" means that a mixture of sulfone based or imide based thermoplastic resin [C] and an epoxy resin, when heated and stirred, comes in a uniform phase state in a certain temperature region. Here, the expression of "in a uniform phase state" means that a state free of separated phases is realized in visual observation. As long as a uniform phase state is realized in a particular temperature region, separation may occur in other temperature regions, at 23° C. for example. Dissolution may be confirmed by the following method. Specifically, powder of a sulfone based or imide based thermoplastic resin [C] is mixed with an epoxy resin and maintained at a constant temperature lower than the Tg of the sulfone based or imide based thermoplastic resin [C] for a few hours, 2 hours for example, while observing the changes in viscosity. The sulfone based or imide based thermoplastic resin [C] can be considered as dissolvable in the epoxy resin if the viscosity is found to increase by 10% or more above the initial viscosity.

The content of a sulfone based or imide based thermoplastic resin [C] is preferably 1 to 25 parts by mass relative to the total epoxy resin quantity which accounts for 100 parts by mass. If staying in this range, the resin have good handleability in terms of tackiness and drape property and give an epoxy resin composition having a viscosity controlled in an appropriate range.

There are no specific limitations on the epoxy resin curing agent [D] (the component [D] is occasionally referred to as epoxy resin curing agent [D]) used in embodiments of the present invention as long as it has an active group that can react with the epoxy resin. Examples of such an active group that can react with epoxy resin include amino groups and acid anhydride groups. The epoxy resin curing agent to be used is preferably as high in storage stability as possible, but since liquid curing agents has high reactivity, it is preferably in a solid state at 23° C.

The epoxy resin curing agent [D] is preferably an aromatic amine and preferably has one to four phenyl groups in its molecule from the viewpoint of heat resistance and mechanical properties. Furthermore, since a flexible molecule backbone can contribute to an increase in the resin's elastic modulus and improvement in mechanical properties, the epoxy resin curing agent is preferably an aromatic polyamine compound in which at least one phenyl group contained in the backbone has an amino group at the ortho or meta positions. Specific examples of such an aromatic polyamine compound include meta-phenylene diamine, diaminodiphenyl methane, diaminodiphenyl sulfone, meta-xylylene diamine, (p-phenylene methylene) dianiline, various derivatives thereof such as alkyl-substituted ones, and various isomers having amino groups at different positions. These curing agents may be used singly or as a mixture of two or more thereof. In particular, diaminodiphenyl methane and diaminodiphenyl sulfone are desirable from the viewpoint of providing a composition that ensures a higher heat resistance.

Commercially available products of such aromatic polyamine curing agents include Seikacure S (manufactured by Wakayama Seika Kogyo Co., Ltd.), MDA-220 (manufactured by Mitsui Chemicals, Inc.), jER Cure (registered trademark) (manufactured by Mitsubishi Chemical Corporation), 3,3'-DAS (manufactured by Mitsui Fine Chemicals, Inc.), Lonzacure (registered trademark) M-DEA (manufactured by Lonza), Lonzacure (registered trademark) M-DIPA (manufactured by Lonza), Lonzacure (registered trademark) M-MIPA (manufactured by Lonza), and Lonzacure (registered trademark) DETDA 80 (manufactured by Lonza).

The optimum content of the epoxy resin curing agent [D] depends on the epoxy resin to be combined. The ratio of the quantity of active hydrogen in the epoxy resin curing agent [D] to that of epoxy groups in the epoxy resin should be adjusted preferably to 0.6 to 1.4, more preferably 0.65 to 1.4, to allow the curing to proceed to a sufficiently high degree and to reduce the adverse influence of an excess of the curing agent to the mechanical properties.

Furthermore, the epoxy resin curing agent [D] adopted in embodiments of the present invention may be combined with an organic acid hydrazide compound. The use of an organic acid hydrazide compound acts to increase the resin viscosity in the temperature region for molding honeycomb structure members, serving to depress the resin flow. The intended viscosity increasing effect will not be realized if the content of the organic acid hydrazide compound is too small whereas the mechanical properties will deteriorate and the storage stability of the resin composition will decrease if it is too large. Accordingly, it is preferably in the range of 0.01 to 10 mass % relative to the total quantity of the epoxy resin composition. A content in this range will serve to realize the effect of improving the curing reactivity of the resin composition and prevent the heat stability of the resin composition and the heat resistance of the cured product from decreasing.

[Chemical formula 5]

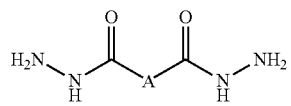

[5]

[Chemical formula 6]

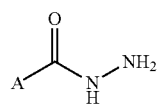

[6]

Particularly preferred examples of the organic acid hydrazide compound include those having a structure as represented by general formula [5] or general formula [6]. In general formula [5] and general formula [6], A is a structure selected from the group consisting of a monocyclic aromatic structure, polycyclic aromatic structure, condensed polycyclic aromatic structure, and aromatic heterocyclic structure, which may have an alkyl group containing 4 or less carbon atoms, hydroxyl group, or amino group as a substituent group.

The use of an organic acid hydrazide compound as represented by general formula [5] or general formula [6] is preferred because it has an aromatic ring structure in its molecule, which makes the molecular backbone more rigid than that of aliphatic hydrazides, serving to produce a cured epoxy resin having high heat resistance. The use of an organic acid hydrazide compound as represented by general formula [5] or general formula [6] is preferred also because it is higher in the reactivity with epoxy resins than aliphatic hydrazides and serves to produce an epoxy resin composition with large resin flow depression effect.

Here, examples of the monocyclic aromatic structure adopted as A in general formula [5] or general formula [6] include the benzene ring, polycyclic aromatic rings such as biphenyl ring and triphenyl ring, and condensed polycyclic aromatic rings such as naphthalene ring, anthracene ring, and rings formed through fusion of the benzene ring and an unsaturated five-membered ring.

Aromatic heterocyclic rings that can serve as A in general formula [5] and general formula [6] include pyridine ring, pyrazine ring, pyrimidine ring, quinoline ring, quinoxaline ring, naphthyridine ring, pyrimidopyrimidine ring, benzoquinoline ring, phenanthroline ring, imidazole ring, oxazole ring, oxadiazole ring, triazole ring, thiazole ring, thiadiazole ring, benzoxazole ring, benzothiazole ring, benzimidazole ring, and phenanthroimidazole ring.

Preferred examples of such an organic acid hydrazide compound include 3-hydroxy-2-naphthoic acid hydrazide, 2,6-naphthalene dicarbodihydrazide, salicylic acid hydrazide, terephthalic acid dihydrazide, and isophthalic acid dihydrazide. These organic acid hydrazide compounds may be used as a mixture of two or more thereof as required.

In an embodiment of the present invention, the quantities of the epoxy resin curing agent [D] and the organic acid hydrazide compounds to be added are controlled so that the total number of active hydrogen atoms contained in them is preferably in the range of 0.7 to 1.3, more preferably 0.8 to 1.2, per epoxy group in the epoxy resin [A] and the epoxy resin [B]. Here, an active hydrogen atom refers to a highly reactive hydrogen atom bound to nitrogen, oxygen or sulfur in an organic compound and for example, the amino group has two active hydrogen atoms. In the case of a hydrazide, only the hydrogen atoms bonded to the terminal nitrogen atoms contribute to the reaction with epoxy groups and accordingly, one hydrazide group is assumed to have two active hydrogen atoms in calculations. A ratio between epoxy groups and active hydrogen atoms in the above mentioned range is preferred because it makes it possible to obtain a cured resin product with a high heat resistance and elastic modulus.

In an embodiment of the present invention, a hydrazide compound other than the organic acid hydrazide compounds included in general formula [5] or general formula [6] may also be added as required. Examples thereof include carbodihydrazide, malonic acid hydrazide, succinic acid dihydrazide, adipic acid dihydrazide, sebacic acid dihydrazide, dodecanedioic acid dihydrazide, and propionic acid hydrazide. Like organic acid hydrazide compounds, these also can effectively work to improve the cure reactivity of resin compositions. However, these hydrazide compounds other than those specified in general formula [5] or general formula [6] preferably account for only 10 mass % or less relative to the total quantity of the epoxy resin composition because if added in large amounts, they can lead to a cured resin product with decreased heat resistance or decreased heat stability.

In an embodiment of the present invention, a bifunctional epoxy resin may be adopted as the component [E] in addition to the components [A] to [D]. The addition of a component [E] serves to control the balance between mechanical properties and heat resistance and adjust the resin viscosity appropriately. There are no specific limitations on the component [E] as long as it is a bifunctional epoxy resin, but preferable examples include bisphenol type epoxy resin, epoxy resin with a biphenyl backbone, epoxy resin with a naphthalene backbone, epoxy resin with a binaphthalene backbone, and novolac type epoxy resin.

Commercially available products of bisphenol A type epoxy resin that can act as the component [E] (the component [E] is occasionally referred to as epoxy resin [E])

include jER (registered trademark) 825, jER (registered trademark) 826, jER (registered trademark) 827, jER (registered trademark) 828, jER (registered trademark) 834, jER (registered trademark) 1001, jER (registered trademark) 1002, jER (registered trademark) 1003, jER (registered trademark) 1004, jER (registered trademark) 1004 AF, jER (registered trademark) 1007, jER (registered trademark) 1009 (all manufactured by Mitsubishi Chemical Corporation), Epicron (registered trademark) 850 (manufactured by DIC Corporation), Epotohto (registered trademark) YD-128 (manufactured by Nippon Steel & Sumikin Chemical Co., Ltd.), DER-331, and DER-332 (both manufactured by The Dow Chemical Company). Commercial products of bisphenol F type epoxy resin include jER (registered trademark) 806, jER (registered trademark) 807, jER (registered trademark) 1750, jER (registered trademark) 4002, jER (registered trademark) 4004P, jER (registered trademark) 4007P, jER (registered trademark) 4009P (all manufactured by Mitsubishi Chemical Corporation), Epicron (registered trademark) 830 (manufactured by DIC Corporation), Epotohto (registered trademark) YD-170, Epotohto (registered trademark) YD-175, Epotohto (registered trademark) YDF2001, and Epotohto (registered trademark) YDF2004 (all manufactured by Nippon Steel & Sumikin Chemical Co., Ltd.).

The epoxy resin [E] preferably accounts for 5 to 40 parts by mass relative to the total quantity of the epoxy resins, which accounts for 100 parts by mass, because it will serve to obtain a composite material having good mechanical properties.

The epoxy resin composition according to embodiments of the present invention may contain particles that contain a thermoplastic resin as the primary component that accounts for 50 mass % or more. Such particles that contain a thermoplastic resin as the primary component is added with the aim of ensuring impact resistance in the fiber reinforced composite material according to embodiments of the present invention. In general, a fiber reinforced composite material has a laminated structure, and if an impact is applied to it, a high stress occurs between the layers to cause delamination damage. Therefore, when it is desired to enhance the impact resistance against impacts from outside, a good method is to increase the toughness of the resin layers (hereinafter, occasionally referred to as interlaminar resin layers) formed between the reinforcement fiber layers in the fiber reinforced composite material. In embodiments of the present invention, the addition of the component [C] is intended for further selective enhancement of the toughness of the interlaminar resin layers in the fiber reinforced composite material according to the present invention. The thermoplastic resin used as the primary component of the above particles may be identical to or different from the thermoplastic resin used as the component [C].

Preferable examples of the thermoplastic resin used as a component of the particles include polyamide, polyimide, and the like, of which polyamide is the most preferable because it is so high in toughness as to serve for large improvement in impact resistance. Preferable examples of such polyamide include polyamide 12, polyamide 11, polyamide 6, polyamide 66, polyamide 6/12 copolymer, and polyamide polymers partially modified with an epoxy compound into an IPN (interpenetrating polymer network) structure (semi-IPN polyamide) as described in Example 1 of Japanese Unexamined Patent Publication (Kokai) No. HEI 01-104624. In regard to the shape of the thermoplastic resin particles, they may be spherical particles, non-spherical particles, or porous particles, of which spherical particles are preferable because they ensure high viscoelasticity by preventing deterioration in the flow properties of the resin and also ensure high impact resistance by eliminating potential starting points of stress concentrations.

Useful commercial products of polyamide particles include SP-500, SP-10, TR-1, TR-2, 842P-48, and 842P-80 (all manufactured by Toray Industries, Inc.), Orgasol (registered trademark) 1002D, 2001UD, 2001EXD, 2002D, 3202D, 3501D, and 3502D (all manufactured by Arkema K.K.), Grilamide (registered trademark) TR90 and TR55 (both manufactured by EMS-Chemie), TROGAMID (registered trademark) CX7323, CX9701, and CX9704 (all manufactured by Degussa AG). These polyamide particle materials may be used singly, or a plurality thereof may be used in combination.

To realize selective toughness enhancement of interlaminar resin layers in the fiber reinforced composite material according to the present invention, it is desirable for the particles containing a thermoplastic resin as primary component to be constrained within the interlaminar resin layers. A preferred technique for constraining particles in interlaminar resin layers is to stack prepreg layers containing particles on fiber surface or in the epoxy resin composition. The particles containing a thermoplastic resin as primary component preferably have a number average particle diameter in the range of 5 to 50 µm, more preferably in the range of 7 to 40 µm, and still more preferably in the range of 10 to 30 µm. A number average particle diameter controlled at 5 µm or more serves to prevent the particles from getting into the bundles of reinforcement fibers and allow them to stay on the carbon fiber surface or in the resin composition between epoxy layers in the resulting fiber reinforced composite material, whereas a number average particle diameter controlled at 50 µm or less serves to form a matrix resin layer with an appropriate thickness on the prepreg surface and, in addition, ensure an appropriate fiber content by mass in the resulting fiber reinforced composite material.

If the epoxy resin composition according to the present invention is used as matrix resin of prepreg, the resin viscosity, which is an indicator of resin flowability, is measured as described below. Specifically, in a dynamic viscoelasticity measuring apparatus, flat parallel plates with a diameter of 40 mm are used as the upper and lower jig plates and an epoxy resin composition is set so that the distance between the upper and lower plates is 1 mm, thus allowing the 80° C. viscosity to be measured at an angular frequency 3.14 rad/s. If it is 0.5 Pa·s or more, it will possible to prevent an excessive resin flow from occurring during the molding of a fiber reinforced composite material and avoid a large variation in the reinforcement fiber content. If the viscosity is 200 Pa·s or less, on the other hand, the reinforcement fiber can be sufficiently impregnated with the epoxy resin composition during prepreg production, and the resulting fiber reinforced composite material will not contain significant voids, thus preventing a strength decrease from occurring in the fiber reinforced composite material. Thus, the viscosity of the epoxy resin composition is preferably 0.5 to 200 Pa·s, and it is more preferably in the range of 5 to 100 Pa·s to ensure good handleability.

In a dynamic viscoelasticity measuring apparatus, flat parallel plates with a diameter of 25 mm are used as the upper and lower jig plates and an epoxy resin composition is set so that the distance between the upper and lower plates is 1 mm. At an angular frequency of 3.14 rad/s, the temperature is increased from 40° C. to 120° C. at a rate of 1.5° C./min, and maintained constant at a temperature of 120° C. for 1 hour, followed by measuring the viscosity of the epoxy resin composition (hereinafter referred to as viscosity after 1 hour retention at 120° C. or η120h), which is preferably in the range of 10 to 50 Pa·s to ensure an appropriate resin flow during molding of honeycomb structures. A value in this range is preferable because it ensures an appropriate resin flowability to achieve high adhesiveness to honeycomb core material and good mechanical properties in final molded artciles.

The epoxy resin composition according to the present invention can be combined with carbon fibers for use as a carbon fiber reinforced composite material. Any known type of carbon fibers may be adopted, but the carbon fibers to be used preferably show a strand strength of a 3,000 MPa or more and 7,500 MPa or less in strand tensile test and have an elastic modulus of 200 GPa or more and 450 GPa or less. Here, the strand tensile test is performed according to JIS R 7601 (1986) using a specimen prepared by impregnating bundles of carbon fibers with a matrix resin composed of the undermentioned components and curing it for 35 minutes at a temperature of 130° C.

3',4'-epoxycyclohexylmethyl-3,4-epoxycyclohexane carboxylate (for example, Celoxide 2021P manufactured by Daicel Chemical Industries, Ltd.): 100 parts by mass
boron trifluoride monoethyl amine (for example, a product manufactured by Stella Chemifa Corporation): 3 parts by mass
acetone (for example, a product manufactured by Wako Pure Chemical Industries, Ltd.): 4 parts by mass The number of filaments in the carbon fiber is preferably 1,000 to 100,000, more preferably 3,000 to 50,000. Complicated operations will be required for prepreg production if the number of carbon fiber filaments is less than 1,000, whereas it will be difficult to infiltrate resin among the filaments, possibly leading to poor impregnation, if the number of carbon fiber filaments is more than 100,000.

The carbon fibers are preferably in the form of continuous fibers paralleled in one direction or woven fabrics of plain weave, sateen weave, or twill weave, and the layers are preferably formed of such carbon fibers. Here, continuous fibers refer to fibers with an average length of 10 mm.

When the epoxy resin composition according to an embodiment of the present invention is used for producing a fiber reinforced composite material, a fiber base may be impregnated with a resin in advance to form prepreg to be molded by a method as described later.

The prepreg according to an embodiment of the present invention is in the form of a base material of carbon fibers, such as a sheet of continuous carbon fibers paralleled in one direction and a carbon fiber woven fabric, that are impregnated with an epoxy resin composition, a carbon fiber base with at least one surface provided with a resin layer of an epoxy resin composition, or a carbon fiber base partly impregnated with an epoxy resin composition with the remaining part carrying the composition at least on one surface thereof. It is preferable that the epoxy resin composition immediately after the impregnation or attachment have flowability in order to ensure an improved workability in molding the prepreg into a predetermined shape.

Such prepreg can be produce by the wet method, hot melt method; etc., that are described below. The wet method includes the steps of immersing a reinforcement fiber base in a solution of an epoxy resin composition and a solvent, pulling it out, and evaporating the solvent using an oven etc., whereas the hot melt method includes the steps of heating an epoxy resin composition to reduce the viscosity and directly impregnating the reinforcement fiber with it, or the steps of coating release paper, film, or the like with the epoxy resin composition to prepare a thin sheet, attaching the thin epoxy resin composition sheet to either or both sides of a reinforcement fiber layer, and pressing them while heating so that the epoxy resin composition is transferred to impregnate the reinforcement fiber. The hot melt method is preferred because the resulting prepreg will be substantially free of residual solvent.

The quantity of carbon fiber per unit area of a prepreg sheet is preferably 70 to 1,000 g/m$^2$. If this quantity of carbon fiber is less than 70 g/m$^2$, a larger number of sheets have to be stacked to ensure a required thickness when molding carbon fiber reinforced composite material, possibly leading to troublesome operation. If this quantity of carbon fiber is more than 1,000 g/m$^2$, on the other hand, the prepreg tends to have poor drape properties. The content of carbon fiber in the prepreg is preferably 30 to 90 mass %, more preferably 35 to 85 mass %, and still more preferably 40 to 80 mass %. A carbon fiber content of 30 mass % or more is preferable because it ensures effective tapping of the high specific strength and specific modulus that represent good features of carbon fiber reinforced composite materials, whereas a content of 90 mass % or less is preferable because it enables easy production of uniform moldings.

When using a carbon fiber woven fabric as fiber base, the gaps present at the intersections of warp and weft yarns in the carbon fiber woven fabric is account for 5% or less at the time of prepreg production. The surface of the woven fabric prepreg is photographed by a stereoscopic microscope while applying light to the other side of the woven fabric prepreg. The weaving yarns are black and the gaps are white in the penetrating light pattern formed in the photograph of the fabric. In an image-processed picture, the entire area S1 and the area of the white regions (gaps), S2, are measured and the proportion of the gaps are calculated as S2/S1.

Plies of the aforementioned prepreg are stacked and the resin is cured by heating while applying a pressure to the stack, thereby producing the carbon fiber reinforced composite material according to an embodiment of the present invention. Here, the application of heat and pressure can be carried out by using an appropriate method such as press molding, autoclave molding, bagging molding, wrapping tape molding, and internal pressure molding. In the wrapping tape molding method, a core bar such as mandrel is wound with a prepreg sheet to produce a tube of carbon fiber reinforced composite material, and this method is suitable for manufacturing rod-like products including golf club shaft and fishing rod. More specifically, a mandrel is wound with a prepreg sheet and further wound with a wrapping tape of thermoplastic resin film to cover the prepreg sheet so that the prepreg sheet is secured and pressed, followed by heating and curing the resin in an oven and removing the core bar to provide a tubular material. In the internal pressure molding method, a preform formed of an internal pressure applying member such as a tube of thermoplastic resin wound with a prepreg sheet is fixed in a mold, and high pressure gas is introduced into the internal pressure applying member to apply a pressure while heating the mold to produce a molded article. This method is preferred for the molding of articles of complicated shapes such as golf club shaft, bat, and rackets for tennis or badminton.

Regarding the curing temperature and time period for molding the carbon fiber reinforced composite material according to the present invention in an autoclave or oven, the optimum temperature and time conditions differ depending on the type and quantity of the curing agent and curing catalyst used, but curing is preferably performed for 0.5 to 8 hours at a temperature of 120° C. to 220° C. when producing a product with heat resistance at 130° C. or more. It is preferred for the heating to be performed at a heating rate of 0.1° C./min to 10° C./min. A heating rate of less than 0.1° C./min may result in a very long period of time required to reach an intended curing temperature, possibly leading to a low workability. A heating rate of more than 10° C./min, on the other hand, will cause an uneven temperature distribution over the reinforcement fiber due to the influence of air flows and internal heat generation, possibly making it impossible to provide a uniform cured product.

Pressurization or depressurization is not essential when molding the carbon fiber reinforced composite material according to the present invention, but pressurization or depressurization may be performed as required. In some cases, pressurization or depressurization has good effects including improvement in surface quality, control of internal void formation, and improvement in the contact with other metal, plastic, or fiber reinforced composite material members to be bonded during the curing step.

The carbon fiber reinforced composite material according to the present invention can be used favorably in a wide variety of applications including aircraft structure members, windmill blades, automobiles' exterior plates, computer parts such as IC trays and notebook computer housing, and sporting goods such as golf club shaft and tennis racket.

EXAMPLES

The present invention is described in more detail below with reference to Examples. The methods used for measuring various physical properties are as described below. Measurement was performed in an environment with a temperature of 23° C. and relative humidity of 50% unless otherwise specified.

Component [A]

An epoxy resin as represented by general formula [1] or [4] wherein X is a methylene group; Y is a naphthalene backbone; and Z is a naphthalene backbone.

Epicron (registered trademark) HP-4770 (bisnaphthalene type epoxy, manufactured by DIC Corporation, epoxy equivalent 205). According to Japanese Unexamined Patent Publication (Kokai) No. 2011-213784, Epicron HP-4770 contains difunctional and tetrafunctional forms of bisnaphthalene type epoxy resin.

An epoxy resin as represented by general formula [1] or [4] wherein X is a methylene group; Y is a toluene backbone; and Z is a naphthalene backbone.

NC-7300L (naphthol type epoxy, manufactured by Nagase ChemteX Corporation, epoxy equivalent 220)

Component [B]

Araldite (registered trademark) MY721 (tetraglycidyl diaminodiphenyl methane, manufactured by Huntsman Advanced Materials Gmbh, epoxy equivalent 112)

TGDDS (tetraglycidyl diaminodiphenyl sulphone, manufactured by Konishi Chemical Ind. Co., Ltd., epoxy equivalent 112)

Araldite (registered trademark) MY0510 (triglycidyl-p-aminophenol, manufactured by Huntsman Advanced Materials Gmbh, epoxy equivalent 100)

Araldite (registered trademark) MY0600 (triglycidyl-m-aminophenol, manufactured by Huntsman Advanced Materials Gmbh, epoxy equivalent 105)

Component [C]

Sumikaexcel (registered trademark) PES5003P (hydroxyl-capped polyethersulfone, manufactured by Sumitomo Chemical Co., Ltd., Tg 225° C.)

Virantage (registered trademark) VW-10700 RP (hydroxyl-capped polyethersulfone, manufactured by Solvay Advanced Polymers, Tg 220° C.)

Sumikaexcel (registered trademark) PES7600P (chlorine-capped polyethersulfone, manufactured by Sumitomo Chemical Co., Ltd., Tg 225° C.)

Virantage (registered trademark) VW-30500RP (polysulfone, manufactured by Solvay Advanced Polymers, Tg 205° C.)

ULTEM (registered trademark) 1010 (polyetherimide, manufactured by Sabic Innovative Platics, Tg 215° C.)

Component [D]

3,3'-DAS (3,3'-diaminodiphenyl sulfone, manufactured by Mitsui Fine Chemical, Inc., active hydrogen equivalent 62, solid at 23° C).

Seikacure S (4,4'-diaminodiphenyl sulfone, manufactured by Wakayama Seika Kogyo Co., Ltd., active hydrogen equivalent 62, solid at 23° C.)

Lonzacure (registered trademark) MIPA (4,4'-methylene bis(2-methyl-6-isopropyl) benzene amine, manufactured by Lonza, active hydrogen equivalent 78, solid at 23° C.)

Organic Acid Hydrazide Compound

Isophthalic acid dihydrazide, manufactured by Otsuka Chemical Co., Ltd.

Component [E]

jER (registered trademark) 807 (bisphenol F type epoxy, manufactured by Mitsubishi Chemical Corporation, epoxy equivalent 170)

jER (registered trademark) 825 (bisphenol A type epoxy, manufactured by Mitsubishi Chemical Corporation, epoxy equivalent 175)

Thermoplastic Resin Particles

Grilamide (registered trademark) TR55 (manufactured by EMS-Chemie) was crushed and classified using an impact type crushing machine to provide fine particles with a number average particle diameter of 20 μm.

(1) Preparation of Epoxy Resin Composition

In a kneader, an epoxy resin as the component [A], epoxy resin as the component [B], thermoplastic resin as the component [C], and epoxy resin as the component [E] were kneaded while heating until the component [C] was melted to provide a transparent viscous liquid. A curing agent used as the component [D] was added to this liquid, and kneading was continued to provide an epoxy resin composition. The components and their proportions used in Examples and Comparative examples are shown in Tables 1 to 5.

(2) Measurement of Viscosity at 80° C. (μ80) of the Epoxy Resin Composition and Measurement of its Viscosity After 1 Hour Retention at 120° C. (η120h)

The viscosity of the epoxy resin composition was measured by a dynamic viscoelasticity measuring machine (ARES-G2, manufactured by TA Instruments). A specimen of the epoxy resin composition was set between upper and lower measuring jigs, which were in the form of parallel flat plates with a diameter of 40 mm, in such a manner that the distance between the upper and lower jig plates was 1 mm, and measurements were taken at an angular frequency of 3.14 rad/s. Heating from 40° C. to 120° C. was performed at a rate of 1.5° C./min and the viscosity at 80° C., η80, was determined. Except for using parallel flat plates with a diameter of 25 mm, the same procedure was carried out to heat from 40° C. to 120° C. at a rate of 1.5° C./min, followed by maintaining the temperature of 120° C. for 1 hour to determine the viscosity after 1 hour retention at 120° C. (η120h).

(3) Bending Test of Cured Resin Product

An uncured resin composition was defoamed in a vacuum and cured at a temperature of 180° C. for 2 minutes in a mold having a 2 mm thick spacer of Teflon (registered trademark) set to produce a product with a thickness of 2 mm. The resulting cured resin product with a thickness of 2 mm was cut to a width of 10±0.1 mm and a length of 60±1 mm to prepare a test piece. Three point bending test with a span distance of 32 mm was conducted according to JIS-K7171 (1994) by using an Instron type universal tester (manufactured by Instron Corporation) to measure the elastic modulus. Six measurements were taken (N=6) and their average was calculated.

(4) Bending Test of Moisture-Containing Cured Resin Product in High Temperature Environment A test piece prepared to the same size as described in paragraph (3) was immersed in a temperature controlled bath at 98° C. for 20 hours, and subsequently the temperature controlled bath was placed in the Instron type universal tester (manufactured by Instron Corporation) described in paragraph (3) set at 121° C. It was maintained in the tank environment for 3 minutes, followed by measuring the elastic modulus under the same measuring conditions as in paragraph (3).

(5) Glass Transition Temperature (Tg) of Cured Resin Product

The glass transition temperature Tg of the cured resin product prepared in paragraph (3) was determined as the midpoint temperature measured by differential scanning calorimetry (DSC) according to JIS K7121 (1987).

(6) Preparation of Woven Fabric Prepreg

The epoxy resin composition prepared in paragraph (1) above was spread over a piece of release paper to prepare a resin film with a predetermined resin metsuke. Sheets of this resin film were set in a prepreg production machine to sandwich a sheet of a reinforcement fiber woven fabric, and heated under pressure so that the fabric was impregnated with the thermosetting resin composition to provide a woven fabric prepreg with a fiber metsuke of 193 g/m$^2$ and a resin content of 38 mass %. Here, the reinforcement fiber woven fabric used was a plain weave woven fabric of Torayca (registered trademark) T400H-3K (3,000 fibers, tensile strength 4,410 MPa, tensile modulus 250 MPa, tensile elongation 1.8%).

(7) Tensile Test of Fiber Reinforced Composite Material

Nine sheets of the woven fabric prepreg were stacked with their warp yarns aligned in the same direction and cured in an autoclave by heating for 2 hours at a temperature of 180° C. under a pressure of 6.10 kgf/cm$^2$ Pa to prepare a composite material. A test piece with a width of 25±0.5 mm, a length of 250±1.0 mm, and a tab-to-tab span of 130±1.0 mm was prepared from the resulting composite material and the warp tensile strength was measured according to EN2597B.

(8) Compression Test of Fiber Reinforced Composite Material

Nine sheets of the woven fabric prepreg were stacked with their warp yarns aligned in the same direction and molded under the same molding conditions as in paragraph (7) to prepare a composite material, from which a test piece with a width of 12.5±0.2 mm, a length of 75 to 80 mm, and a tab-to-tab span of 5.25±0.25 mm was prepared, followed by measuring the warp compressive strength according to EN2597B.

(9) Impact Resistance Test of Fiber Reinforced Composite Material

First, 24 sheets of the woven fabric prepreg were stacked in a pseudoisotropic manner with their directions aligned to [45°/0°/−45°/90°]$_{3s}$ (the symbol s representing mirror symmetry), where 0° is the warp direction, and molded under the same molding conditions as in paragraph (7) to prepare a composite material, from which a test piece with a width of 100±0.2 mm and a length of 150±0.2 mm was prepared. A falling weight impact was applied to the center with a weight of 5.4 kg falling from a height of 468 mm and then the test piece was compressed with a crosshead speed of 0.5 mm/min using a compression jig according to SACMA SRM 2R-94 to determine the compressive strength. Six measurements were taken (N=6) and their average was calculated.

TABLE 1

| | Example 1 | Example 2 | Example 3 | Example 4 | Example 5 | Example 6 | Example 7 | Example 8 |
|---|---|---|---|---|---|---|---|---|
| Component [A] | | | | | | | | |
| HP-4770 | 30 | 10 | 40 | 30 | | | 30 | |
| NC-7300L | | | | | 30 | 10 | | 20 |
| Component [B] | | | | | | | | |
| MY721 | 70 | 90 | | | | 90 | | 80 |
| TGDDS | | | 60 | 70 | | | | |
| MY0510 | | | | | | | 70 | |
| MY0600 | | | | | 70 | | | |
| Component [C] | | | | | | | | |
| PES5003P | 10 | | | | | | | |
| VW-10700RP | | | | | | 10 | 10 | |
| PES7600P | | | 10 | 10 | | | | |
| VW-30500RP | | 10 | | | | | | 20 |
| ULTEM ®1010 | | | | | 10 | | | |
| Component [D] | | | | | | | | |
| 3,3'-DAS | 45 | 45 | | | 50 | 50 | 50 | 50 |
| Seikacure S | | | 45 | | | | | |
| Lonzacure ®MIPA | | | | 45 | | | | |
| Component [E] | | | | | | | | |
| jER ®807 | | | | | | | | |
| jER ®825 | | | | | | | | |

TABLE 1-continued

|  | Example 1 | Example 2 | Example 3 | Example 4 | Example 5 | Example 6 | Example 7 | Example 8 |
|---|---|---|---|---|---|---|---|---|
| Quantity of [C] relative to total (100 parts by mass) of [A] + [B] + [E] | 10 | 10 | 10 | 10 | 10 | 10 | 10 | 20 |
| Quantity of epoxy resin [E] relative to total (100 parts by mass) of epoxy resins [A] + [B] + [E] | 0 | 0 | 0 | 0 | 0 | 0 | 0 | 0 |
| Elastic modulus of cured resin product [GPa] | 4.4 | 4.5 | 4.2 | 4.3 | 4.6 | 4.3 | 4.3 | 4.2 |
| Elastic modulus of cured resin product in high temperature moistening environment [GPa] | 3.1 | 3.2 | 2.9 | 3.0 | 2.7 | 3.0 | 3.2 | 3.0 |
| Tg of cured resin product [° C.] | 217 | 225 | 186 | 223 | 201 | 227 | 200 | 225 |
| Warp tensile strength [MPa] | 734 | 711 | 833 | 716 | 785 | 705 | 787 | 760 |
| Warp compressive strength [MPa] | 884 | 895 | 865 | 875 | 901 | 882 | 880 | 871 |

Figures without units in Table are in parts by mass.

TABLE 2

|  | Example 9 | Example 10 | Example 11 | Example 12 | Example 13 | Example 14 | Example 15 | Example 16 | Example 17 | Example 18 | Example 19 |
|---|---|---|---|---|---|---|---|---|---|---|---|
| Component [A] | | | | | | | | | | | |
| HP-4770 | 30 | 20 | 20 | | 20 | 20 | 30 | | 40 | 30 | 25 |
| NC-7300L | | | | 30 | | | | 20 | | | |
| Component [B] | | | | | | | | | | | |
| MY721 | | | | | 60 | 40 | | | | 70 | 70 |
| TGDDS | | 80 | | 70 | | | 60 | | | | |
| MY0510 | 70 | | | | 20 | 40 | | 70 | 30 | | |
| MY0600 | | | 80 | | | | | | | | |
| Component [C] | | | | | | | | | | | |
| PES5003P | 10 | | | | | | | | 10 | 1 | 10 |
| VW-10700RP | | | | | | | | 10 | | | |
| PES7600P | | | | 10 | | | | | | | |
| VW-30500RP | | 10 | | | 10 | 10 | | | | | |
| ULTEM ®1010 | | | 10 | 10 | | | | 10 | | | |
| Component [D] | | | | | | | | | | | |
| 3,3'-DAS | | | 50 | | 45 | 50 | | 35 | 40 | 45 | 45 |
| Seikacure S | 70 | 45 | | | | | 50 | | | | |
| Lonzacure ®MIPA | | | | 50 | | | | | | | |
| Component [E] | | | | | | | | | | | |
| jER ®807 | | | | | | | 10 | 10 | 30 | | 5 |
| jER ®825 | | | | | | | | | | | |
| Quantity of [C] relative to total (100 parts by mass) of [A] + [B] + [E] | 10 | 10 | 10 | 10 | 10 | 10 | 10 | 10 | 10 | 1 | 10 |
| Quantity of epoxy resin [E] relative to total (100 parts by mass) of epoxy resins [A] + [B] + [E] | 0 | 0 | 0 | 0 | 0 | 0 | 10 | 10 | 30 | 0 | 5 |
| Elastic modulus of cured resin product [GPa] | 4.0 | 4.4 | 5.0 | 4.0 | 4.6 | 4.5 | 4.1 | 4.2 | 4.1 | 4.5 | 4.3 |
| Elastic modulus of cured resin product in high temperature moistening environment [GPa] | 2.6 | 3.1 | 3.0 | 2.8 | 3.0 | 2.9 | 2.8 | 2.7 | 2.9 | 3.2 | 3.0 |
| Tg of cured resin product [° C.] | 227 | 225 | 195 | 219 | 209 | 211 | 219 | 198 | 188 | 215 | 214 |
| Warp tensile strength [MPa] | 704 | 710 | 804 | 729 | 760 | 753 | 729 | 795 | 825 | 741 | 744 |
| Warp compressive strength [MPa] | 853 | 885 | 934 | 851 | 904 | 896 | 858 | 870 | 861 | 895 | 878 |

Figures without units in Table are in parts by mass.

TABLE 3

| | Comparative example 1 | Comparative example 2 | Comparative example 3 | Comparative example 4 | Comparative example 5 | Comparative example 6 | Comparative example 7 |
|---|---|---|---|---|---|---|---|
| Component [A] | | | | | | | |
| HP-4770 | | | | | | | 50 |
| NC-7300L | | 100 | 50 | 40 | | 60 | |
| Component [B] | | | | | | | |
| MY721 | | | | 60 | | | |
| TGDDS | | | | | | | |
| MY0510 | 100 | | 10 | | | 20 | |
| MY0600 | | | | | 60 | | |
| Component [C] | | | | | | | |
| PES5003P | | | | | | | |
| VW-10700RP | | 10 | | | | 10 | |
| PES7600P | | | 10 | | | | |
| VW-30500RP | 10 | | | | | | |
| ULTEM ®1010 | | | | | | | |
| Component [D] | | | | | | | |
| 3,3'-DAS | | 30 | 35 | | | | |
| Seikacure S | | | | | 45 | 35 | 45 |
| Lonzacure ®MIPA | 50 | | | 50 | | | |
| Component [E] | | | | | | | |
| jER ®807 | | | 40 | | | | |
| jER ®825 | | | | | 40 | 20 | 50 |
| Quantity of [C] relative to total (100 parts by mass) of [A] + [B] + [E] | 10 | 10 | 10 | 0 | 0 | 10 | 0 |
| Quantity of epoxy resin [E] relative to total (100 parts by mass) of epoxy resins [A] + [B] + [E] | 0 | 0 | 40 | 0 | 40 | 20 | 50 |
| Elastic modulus of cured resin product [GPa] | 3.7 | 3.2 | 3.6 | 3.3 | 3.7 | 2.8 | 3.1 |
| Elastic modulus of cured resin product in high temperature moistening environment [GPa] | 2.4 | 2.6 | 2.7 | 2.3 | 2.4 | 2.1 | 2.0 |
| Tg of cured resin product [° C.] | 221 | 213 | 177 | 239 | 202 | 219 | 197 |
| Warp tensile strength [MPa] | 723 | 747 | 858 | 617 | 733 | 729 | 797 |
| Warp compressive strength [MPa] | 827 | 784 | 816 | 791 | 830 | 754 | 776 |

Figures without units in Table are in parts by mass.

TABLE 4

| | Example 1 | Example 20 |
|---|---|---|
| Component [A] | | |
| HP-4770 | 30 | 30 |
| NC-7300L | | |
| Component [B] | | |
| MY721 | 70 | 70 |
| TGDDS | | |
| MY0510 | | |
| MY0600 | | |
| Component [C] | | |
| PES5003P | 10 | 10 |
| VW-10700RP | | |
| PES7600P | | |
| VW-30500RP | | |
| ULTEM ®1010 | | |
| Component [D] | | |
| 3,3'-DAS | 45 | 45 |
| Seikacure S | | |
| Lonzacure ®MIPA | | |
| Component [E] | | |
| jER ®807 | | |
| jER ®825 | | |
| Quantity of [C] relative to total (100 parts by mass) of [A] + [B] + [E] | 10 | 10 |
| Quantity of epoxy resin [E] relative to total (100 parts by mass) of epoxy resins [A] + [B] + [E] | 0 | 0 |
| Thermoplasticity particles | | |
| Grilamide ® TR55 fine particles | 0 | 10 |
| Elastic modulus of cured resin product [GPa] | 4.4 | 4.1 |
| Elastic modulus of cured resin product in high temperature moistening environment [GPa] | 3.1 | 2.7 |
| Tg of cured resin product [° C.] | 217 | 205 |
| Warp tensile strength [mpa] | 734 | 772 |
| Warp compressive strength [mpa] | 884 | 861 |
| Impact resistance [mpa] | 224 | 245 |

Figures without units in Table are in parts by mass.

TABLE 5

|  | Example 18 | Example 21 |
|---|---|---|
| Component [A] | | |
| HP-4770 | 30 | 30 |
| NC-7300L | | |
| Component [B] | | |
| MY721 | 70 | 70 |
| TGDDS | | |
| MY0510 | | |
| MY0600 | | |
| Component [C] | | |
| PES5003P | 1 | 1 |
| VW-10700RP | | |
| PES7600P | | |
| VW-30500RP | | |
| ULTEM ®1010 | | |
| Component [D] | | |
| 3,3'-DAS | 45 | 45 |
| Seikacure S | | |
| Lonzacure ®MIPA | | |
| Curing accelerator | | |
| isophthalic acid dihydrazide | | 7 |
| Component [E] | | |
| jER ®807 | | |
| jER ®825 | | |
| Quantity of [C] relative to total (100 parts by mass) of [A] + [B] + [E] | 1 | 1 |
| Quantity of epoxy resin [E] relative to total (100 parts by mass) of epoxy resins [A] + [B] + [E] | 0 | 0 |
| Proportion of curing accelerator to total quantity of epoxy resin composition ([A] + [B] + [C] + [D] + curing accelerator + [E]) [mass %] | 0 | 5 |
| Elastic modulus of cured resin product [GPa] | 4.5 | 4.3 |
| Elastic modulus of cured resin product in high temperature moistening environment [GPa] | 3.2 | 2.6 |
| Tg of cured resin product [° C.] | 215 | 210 |
| Warp tensile strength [MPa] | 741 | 757 |
| Warp compressive strength [MPa] | 895 | 878 |
| Viscosity after 1 hour retention at 120° C.: η120 h [Pa · s] | 9 | 25 |

Figures without units in Table are in parts by mass.

For the present invention, a cured resin product was rated as acceptable when the cured resin product had an elastic modulus of 4.0 GPa or more; the cured resin product had an elastic modulus of 2.4 GPa or more in a high temperature moistening environment; the cured resin product had a Tg of 180° C. or more; it had a warp tensile strength of 700 MPa or more; and it had a warp compressive strength of 850 MPa or more.

In all Examples, it was conformed that the value of η80 was in the range of 0.5 to 200 Pa·s, that the epoxy resin composition can work effectively in impregnation during the prepreg preparation process, and that the resulting prepreg had a high tackiness for bonding between prepreg sheets and bonding between a prepreg sheet and a metal plate.

Examples 1 to 12 and 18

As shown in Tables 1 and 2, the components [A], [B], [C], and [D] were blended in Examples 1 to 12, and the resulting cured resin products and fiber reinforced composite materials were subjected to tests. Results obtained indicated that they all had good properties including elastic modulus, Tg, warp tensile strength, and warp compressive strength.

Examples 13 and 14

As shown in Table 2, the same procedure as in Examples 1 to 12 except for using a two-element component [B] was carried out and the resulting cured resin products and fiber reinforced composite materials were subjected to tests. Results obtained indicated that they had good properties.

Examples 15 to 17 and 19

As shown in Table 2, the same procedure as in Examples 1 to 12 except for using a component [E] in addition to the components [A], [B], [C], and [D] was carried out and the resulting cured resin products and fiber reinforced composite materials were subjected to tests. Results obtained indicated that they had good properties.

Comparative Examples 1 to 7

As seen from Table 3, the cured product obtained had a decreased elastic modulus and warp compressive strength in Comparative example 1, in which the component [A] was not used. The cured resin product obtained had a decreased elastic modulus and warp compressive strength in Comparative example 2, in which the component [B] was not used. The cured resin product obtained had a decreased elastic modulus and warp compressive strength in Comparative example 3, in which the content of the component [B] was small. The cured resin product obtained had a decreased elastic modulus, elastic modulus in a high temperature moistening environment, warp tensile strength, and warp compressive strength in Comparative example 4, in which the component [C] was not used. The cured resin product obtained had a low elastic modulus and a decreased warp compressive strength in Comparative example 5, in which both the component [A] and the component [C] were not used. The cured resin product obtained had a decreased elastic modulus, elastic modulus in a high temperature moistening environment, and warp compressive strength in Comparative example 6, in which the component [A] was added in an excessive quantity. The cured resin product obtained had a decreased elastic modulus, elastic modulus in a high temperature moistening environment, and warp compressive strength in Comparative example 7, in which the component [E] was added in an excessive quantity.

Example 20

As shown in Table 4, except for adding thermoplastic resin particles when preparing an epoxy resin composition, the same procedure was carried out as in Example 1 to provide a woven fabric prepreg, from which a interlaminar resin layer for fiber reinforced composite material was prepared and subjected to comparison with Example 1 in terms of the impact resistance of the fiber reinforced composite material produced. It was confirmed that the impact resistance was higher in Example 20, in which thermoplastic resin particles were added, than in Example 1.

Example 21

In Example 21, except for adding isophthalic acid dihydrazide as the organic acid hydrazide compound when preparing an epoxy resin composition as shown in Table 5, the same procedure as in Example 18 was carried out to blend the components [A], [B,] [C], and [D], measure the viscosity of the epoxy resin composition, and test the resulting cured resin product and fiber reinforced composite material. In Example 21, where isophthalic acid dihydrazide was added, the viscosity after 1 hour retention at 120° C. (η120h) was increased to reach as high as 25 Pa·s compared to Example 18. This viscosity is in the highly preferred range for honeycomb moldability. The elastic modulus in a high temperature moistening environment was in the acceptable range although it slightly decreased as a result of the addition of the organic acid hydrazide compound.

The invention claimed is:

1. An epoxy resin composition comprising components [A] to [D],
   the component [A] accounting for 5 to 30 parts by mass,
   the component [B] accounting for 20 to 95 parts by mass, and
   the component [C] accounting for 1 to 25 parts by mass, relative to the total quantity of the epoxy resins which account for 100 parts by mass, and
   an 80° C. viscosity measured at an angular frequency of 3.14 rad/s is in the range of 5 to 100 Pa·s
   [A]: epoxy resin having one or more condensed polycyclic aromatic hydrocarbon backbones and mainly two epoxy groups in a repeating unit as represented by general formula [1] or [4],

[Chemical formula 1]

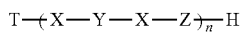

[1]

[Chemical formula 2]

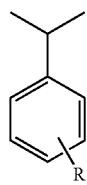

[2]

[Chemical formula 3]

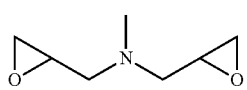

[3]

[Chemical formula 4]

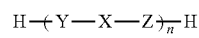

[4]

wherein:
   X in general formulae [1] and [4] is an alkylene group containing 1 or 2 carbon atoms or a group as represented by general formula [2];
   R in general formula [2] is one selected from the group consisting of a glycidyl ether group, a group as represented by general formula [3], a hydrogen atom, a halogen atom, a phenyl group, and an alkyl group containing 1 to 4 carbon atoms;
   Y is an aromatic ring or a condensed polycyclic aromatic hydrocarbon;
   Z is a condensed polycyclic aromatic hydrocarbon;
   n is 1 or greater;
   Y and Z each have a glycidyl ether group, or either Y or Z has a substituent group as represented by general formula [3], and each repeating unit mainly contains two epoxy groups;
   the aromatic ring and condensed polycyclic aromatic ring in Y or Z may be bonded to the backbone chain at the ortho position or the meta position; and
   T is a polycyclic aromatic hydrocarbon or a hydrogen atom;
   [B]: a glycidyl amine type epoxy resin having three or more glycidyl groups in a molecule;
   [C]: sulfone based or imide based thermoplastic resin; and
   [D]: epoxy resin curing agent.

2. An epoxy resin composition as set forth in claim 1, wherein an isophthalic acid dihydrazide compound accounts for 0.01 to 10 mass% in the component [D].

3. An epoxy resin composition as set forth in claim 1, wherein X in general formula [1] for the component [A] contains only one carbon atom; Y and Z are each a naphthalene backbone.

4. An epoxy resin composition as set forth in claim 1, wherein X in general formula [1] for the component [A] contains only one carbon atom; Y is a toluene backbone; and Z is a naphthalene backbone.

5. An epoxy resin composition as set forth in claim 1, wherein the component [C] has a glass transition temperature of 180° C. or more.

6. An epoxy resin composition as set forth in claim 1, wherein the component [D] is solid at 23° C.

7. An epoxy resin composition as set forth in claim 1, wherein the component [D] is an aromatic amine.

8. An epoxy resin composition as set forth in claim 1, wherein the component [D] is an aromatic polyamine having one to four phenyl groups in one molecule, at least one of the phenyl groups containing an amino group at the ortho position or the meta position.

9. An epoxy resin composition as set forth in claim 1, further comprising a glycidyl ether type epoxy resin having two glycidyl groups in a molecule as a component [E].

10. An epoxy resin composition as set forth in claim 9, wherein the component [E] is either a bisphenol A type epoxy resin or a bisphenol F type epoxy resin.

11. An epoxy resin composition as set forth in claim 9, wherein the component [E] accounts for 5 or more parts by mass and 40 or less parts by mass relative to the total quantity of the epoxy resin components which accounts for 100 parts by mass.

12. An epoxy resin composition as set forth in claim 1, wherein the viscosity after 1 hour retention at 120° C., which is denoted by η120h, is 10 to 50 Pa·s.

13. A prepreg produced by impregnating carbon fiber with an epoxy resin composition as set forth in claim 1.

14. A prepreg as set forth in claim 13, wherein thermoplastic particles with a number average particle diameter of 5 to 50 μm are present on the carbon fiber surface or in the epoxy resin composition.

15. A prepreg as set forth in claim 13, wherein the carbon fiber is in the form of woven fabric.

16. A carbon fiber reinforced composite material comprising an epoxy resin composition as set forth in claim 1 and reinforcement fiber.

17. A carbon fiber reinforced composite material as set forth in claim 16, wherein the carbon fiber is in the form of woven fabric.

18. A carbon fiber reinforced composite material produced by curing prepreg as set forth in claim 13.

* * * * *